US008990503B2

(12) United States Patent
Moir et al.

(10) Patent No.: US 8,990,503 B2
(45) Date of Patent: Mar. 24, 2015

(54) MONITORING MULTIPLE MEMORY LOCATIONS FOR TARGETED STORES IN A SHARED-MEMORY MULTIPROCESSOR

(71) Applicant: Oracle International Corporation, Redwood City, CA (US)

(72) Inventors: Mark S. Moir, Wellington (NZ); Paul N. Loewenstein, Palo Alto, CA (US); David Dice, Foxboro, MA (US)

(73) Assignee: Oracle International Corporation, Redwood Shores, CA (US)

( * ) Notice: Subject to any disclaimer, the term of this patent is extended or adjusted under 35 U.S.C. 154(b) by 234 days.

(21) Appl. No.: 13/754,700

(22) Filed: Jan. 30, 2013

(65) Prior Publication Data

US 2014/0215157 A1 Jul. 31, 2014

(51) Int. Cl.
*G06F 12/08* (2006.01)

(52) U.S. Cl.
CPC ........ *G06F 12/0811* (2013.01); *G06F 12/0831* (2013.01)
USPC ............................ 711/122; 711/146; 711/147

(58) Field of Classification Search
None
See application file for complete search history.

(56) References Cited

U.S. PATENT DOCUMENTS

| | | | | |
|---|---|---|---|---|
| 7,246,205 | B2 * | 7/2007 | Balakrishnan et al. | 711/138 |
| 7,519,780 | B2 * | 4/2009 | DeMent et al. | 711/151 |
| 8,051,250 | B2 * | 11/2011 | Gaither et al. | 711/141 |
| 2008/0229009 | A1 * | 9/2008 | Gaither et al. | 711/113 |

* cited by examiner

*Primary Examiner* — Kevin Verbrugge

(74) *Attorney, Agent, or Firm* — Park, Vaughan, Fleming & Dowler LLP

(57) ABSTRACT

A system and method for supporting targeted stores in a shared-memory multiprocessor. A targeted store enables a first processor to push a cache line to be stored in a cache memory of a second processor. This eliminates the need for multiple cache-coherence operations to transfer the cache line from the first processor to the second processor. More specifically, the disclosed embodiments provide a system that notifies a waiting thread when a targeted store is directed to monitored memory locations. During operation, the system receives a targeted store which is directed to a specific cache in a shared-memory multiprocessor system. In response, the system examines a destination address for the targeted store to determine whether the targeted store is directed to a monitored memory location which is being monitored for a thread associated with the specific cache. If so, the system informs the thread about the targeted store.

20 Claims, 5 Drawing Sheets

MONITORING MULTIPLE MEMORY LOCATIONS FOR TARGETED STORES IN A SHARED-MEMORY MULTIPROCESSOR

BACKGROUND

1. Field

The disclosed embodiments relate to shared-memory multiprocessor systems. More specifically, the disclosed embodiments relate to a shared-memory multiprocessor system that monitors multiple memory locations on behalf of a thread, and then notifies the thread when a targeted store is directed to one of the monitored memory locations.

2. Related Art

Shared-memory multiprocessor systems are continuing to grow in size, with increases both in the number of cores per chip, and the number of chips in a system. Moreover, there are differences in the number and size of caches, how they are shared (or not), and latencies among various levels of cache within and between chips, and to local and remote memory. Despite these differences, as systems grow, the latency of accessing remote elements (e.g., cache or memory) inherently grows relative to the latency of accessing local elements. That is, systems are increasingly NUMA (Non-Uniform Memory Access), and the NUMA constants (ratios of latencies to access remote and local elements) are growing.

Significant challenges for programmers accompany these changes. Software that has performed acceptably on smaller systems can suffer severe performance degradation when scaled to larger systems, especially due to NUMA effects.

Consider, for example, a hypothetical application running on a single-socket, multi-core system. Suppose the working set of the application is such that it fits comfortably in an on-chip cache (say L2), so that it exhibits good cache locality and performs well. In particular, when one thread accesses a memory location that has recently been modified by another thread, the location is likely to be in the on-chip L2 cache, in which case the access hits in the cache and no off-chip communication is required to satisfy the memory request. Otherwise, the location is stored in a memory that is physically close to the (single) processor chip.

Consider now a larger system with multiple processor sockets. Memory that is located physically close to one processor is necessarily further from others. Similarly, the caches of other processors are physically further away than a processor's own caches. Broadly, systems meeting this description are referred to as NUMA (Non-Uniform Memory Access). If the same application is configured now to run on such a system, even though its working set may still fit comfortably in cache, now threads are running on different chips, and therefore inter-chip communication is required to keep the caches on the multiple chips coherent. In this case, when one thread accesses a memory location that has recently been modified by another, it is likely that the other thread is on a different chip. In this case, if the location is still in a cache near the thread that recently modified it, then it needs to be invalidated or downgraded in that cache, and brought into the cache of the thread performing the subsequent access. Alternatively, the location may no longer be cached; it may be stored at its home memory node, which is likely to be memory other than the memory located physically close to the thread performing the subsequent access.

The first problem in this scenario is obvious: the latency to access a memory location can increase significantly as system sizes grow. Perhaps less obviously, the bandwidth available for coherence and data communication is not growing at the same rate that the number of cores in systems is growing. Therefore, the problem may be further exacerbated when the coherence and memory traffic produced by an application or set of applications approach the bandwidth limitations of the system.

Therefore, techniques for reducing the amount of remote communication required by applications are needed, as well as techniques for reducing the cost—in terms of latency, bandwidth, or both.

SUMMARY

The present embodiments provide a system that supports targeted stores in a shared-memory multiprocessor. A targeted store enables a first processor to push a cache line to be stored in a cache memory of a second processor in the shared-memory multiprocessor. This eliminates the need for multiple cache-coherence operations to transfer the cache line from the first processor to the second processor.

In a multi-processor system that supports targeted stores, a thread which is waiting for a targeted store may have to continually poll one or more memory locations to determine when the targeted store arrives. This keeps the associated cache lines in the thread's local cache, and in doing so keeps the cache lines away from the threads that want to store to them. The thread can also consume a significant amount of power while performing these polling operations.

To alleviate these problems, the disclosed embodiments provide a system that monitors specific memory locations for targeted stores, and then notifies waiting threads when a targeted store is directed to one of the specific memory locations. This eliminates the need for the waiting threads to continually poll the specific memory locations. During operation, the system receives a targeted store which is directed to a specific cache in a shared-memory multiprocessor system. In response, the system examines a destination address for the targeted store to determine whether the targeted store is directed to a monitored memory location which is being monitored on behalf of a thread associated with the specific cache. If so, the system informs the thread about the targeted store.

In some embodiments, the monitored memory location is one of a set of multiple memory locations being monitored for the thread. (For example, if the system is monitoring a range of addresses, all addresses falling within this monitored range can be considered "monitored addresses.")

In some embodiments, the specific cache comprises a single cache memory (or a set of proximate cache memories) in the shared-memory multiprocessor.

In some embodiments, upon receiving a request to monitor a set of monitored addresses for a thread, the system configures a monitoring circuit associated with the specific cache to look for a targeted store having a destination address that matches a monitored address for the thread.

In some embodiments, the system uses a monitoring circuit which is proximate to but separate from the specific cache to determine whether the destination address for the targeted store is directed to a monitored memory location.

In some embodiments, the system uses a monitoring circuit which is incorporated into the specific cache to determine whether the destination address for the targeted store is directed to a monitored memory location.

In some embodiments, informing the thread about the targeted store includes communicating the destination address for the targeted store to the thread.

In some embodiments, informing the thread about the targeted store includes communicating a bitmap to the thread, wherein the bitmap provides summary information indicating sets of addresses, in a set of multiple memory locations which are being monitored for the thread, that may have received targeted stores.

In some embodiments, informing the thread about the targeted store includes informing the thread that an unspecified location, in a set of multiple memory locations which are being monitored for the thread, has received a targeted store.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system that notifies a waiting thread when a targeted store is directed to a monitored memory location. Before we describe this monitoring mechanism, we first describe a shared-memory multiprocessor system that performs targeted stores.

Shared-Memory Multiprocessor System

Figure 1:
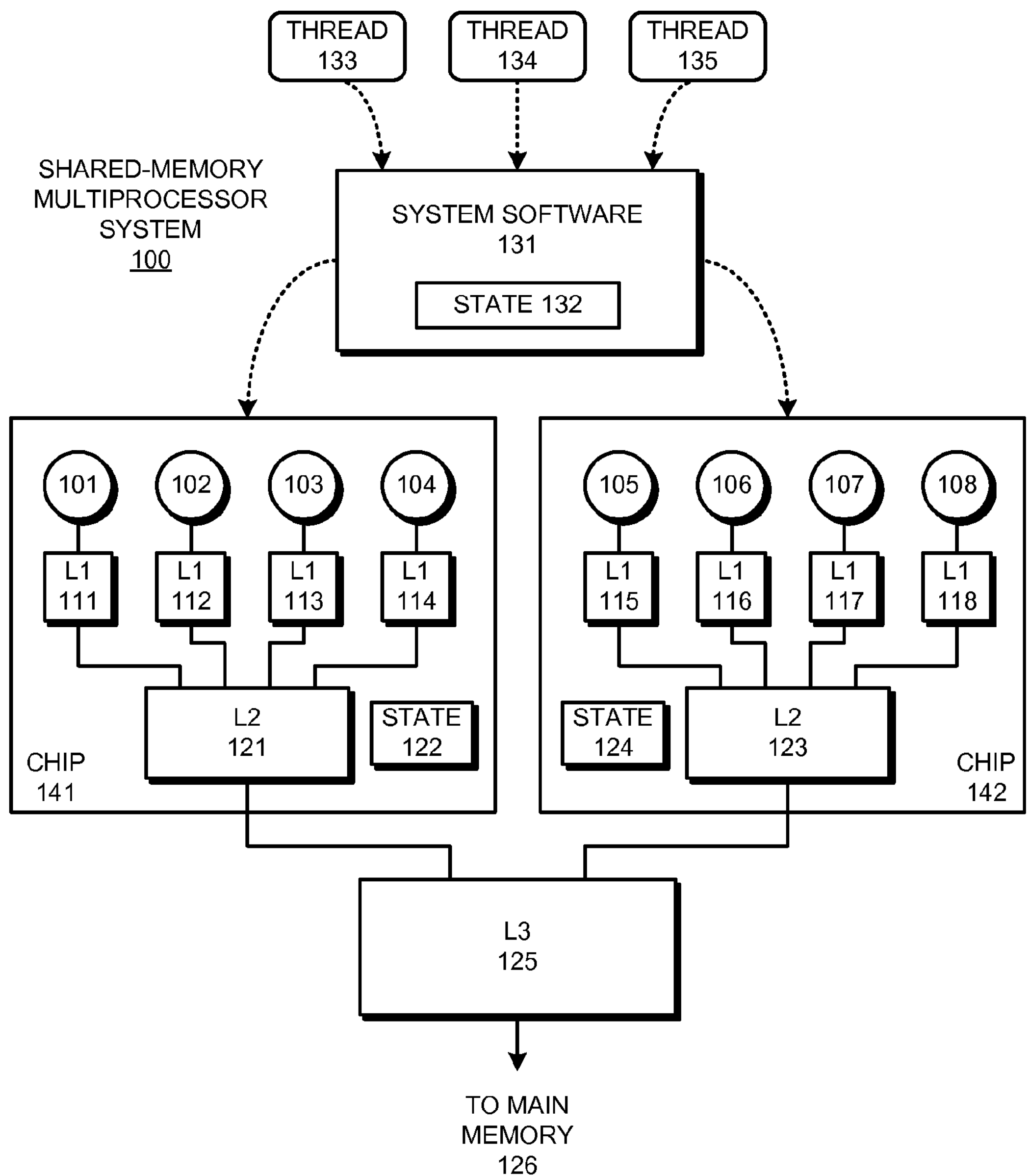
FIG. 1 illustrates a shared-memory multiprocessor system in accordance with the disclosed embodiments.

FIG. 1 illustrates an exemplary shared-memory multiprocessor system 100 in accordance with the disclosed embodiments. Shared-memory multiprocessor system 100 includes a number of processor cores 101-108 that execute instructions and perform associated operations on data located in level one (L1) caches 111-118. These L1 caches 111-118 comprise a portion of a memory hierarchy, which includes L2 caches 121 and 123, as well as L3 cache 125. In the embodiment illustrated in FIG. 1, processor cores 101-104 are coupled to L1 caches 111-114, which are coupled to L2 cache 121, and all of these cores and caches are located on semiconductor chip 141. Similarly, processor cores 105-108 are coupled to L1 caches 115-118, which are coupled to L2 cache 123, and all of these cores and caches are located on semiconductor chip 142. Finally, L2 caches 121 and 123 are coupled to L3 cache 125, and L3 cache 125 is coupled with main memory 126 (not shown). In some embodiments there may be more or fewer levels of on-chip caches. Also, there may be multiple off-chip L3 caches or no off-chip L3 cache. Moreover, other embodiments may include multiple memories instead of a single main memory.

Note that each of L1 caches 111-118 can be implemented using a combined instruction and data cache. Alternatively, each of L1 caches 111-118 can be implemented using a separate L1 instruction cache and a separate L1 data cache.

Moreover, all of the illustrated caches (including L1 caches 111-118, L2 caches 121 and 123, and L3 cache 125) collectively form a cache-coherent memory system which operates in accordance with a specific cache-coherence policy, such as the MOESI cache-coherence policy.

Also note that semiconductor chip 141 maintains state information 122, which includes thread-specific state information that can be used to determine which processor cores and associated caches are accessed by a specific thread. Similarly, semiconductor chip 142 maintains state information 124, which can be used to determine which processor cores and associated caches are accessed by a specific thread that executes within semiconductor chip 142. Note that this state information 122 and 124 can be used to determine where a specific thread is located as is described below with reference to FIGS. 4 and 5.

As illustrated in FIG. 1, system software 131 controls the execution of a number of threads 133-135 on processor cores 101-108. For example, system software 131 can allocate thread 133 to execute on processor core 102, while thread 134 executes on processor core 104 and thread 135 executes on processor core 108. Note that system software 131 can include lower-level system software, such as a hypervisor, and can also include higher-level system software, such as an operating system. System software 131 also contains state information 132, wherein state information 132 includes thread-specific state information which can be used to determine which processor cores and associated caches are accessed by a specific thread.

Interface

Figure 2:
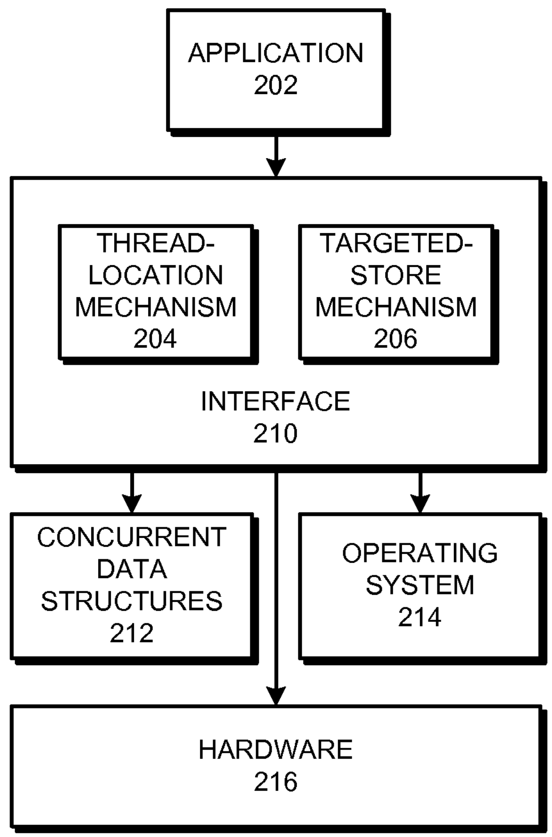
FIG. 2 illustrates an interface that supports targeted stores in accordance with the disclosed embodiments.

FIG. 2 illustrates an interface 210 that supports targeted stores in accordance with the disclosed embodiments. As illustrated in FIG. 2, an application 202 can access interface 210, wherein interface 210 provides access to a number of mechanisms, including a thread-location mechanism 204 and a targeted-store mechanism 206. Interface 210 can include an application programming interface (API) which provides functions or methods to perform the thread-location and targeted-store operations. In this case, the thread-location mechanism 204 is implemented using a thread-location function (e.g., localTarget( )), and targeted-store mechanism 206 is implemented using a targeted-store function. These functions can interact with the computer system in a number of different ways. For example, the functions can access concurrent data structures 212 which can be used to store thread-location information. They can also make system calls to operating system 214. The functions can also execute instructions that are defined in an instruction-set architecture and which execute on and/or access hardware 216.

Interface 210 can alternatively be a system call interface which is exposed by the operating system to provide system calls to perform the thread-location and targeted-store operations. In this case, thread-location mechanism 204 and targeted-store mechanism 206 are implemented as system calls. These system calls can access concurrent data structures 212, make further system calls to operating system 214, or can execute instructions to execute on and/or access hardware 216.

Interface 210 can also be implemented using hardware that executes instructions defined within an instruction-set architecture. In this case, the thread-location mechanism 204 may be implemented through a special-purpose thread-location instruction, and the targeted-store mechanism may be implemented through a special-purpose targeted-store instruction.

Figure 3:
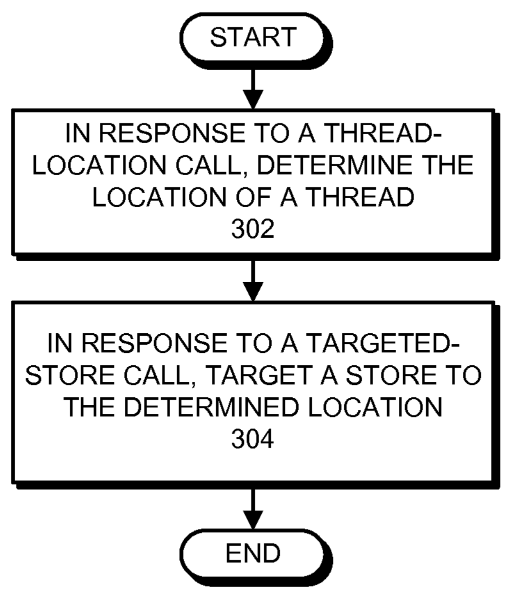
FIG. 3 presents a flow chart illustrating the process of responding through the interface to calls that support targeted stores.

FIG. 3 presents a flow chart illustrating the process of responding through the interface 210 to calls that support targeted stores. First, in response to a thread-location call, the system determines the location of the thread making the call (step 302). Next, in response to a targeted-store call, the system performs a targeted store to the determined location (step 304). Note that the thread-location call and the targeted-store call can comprise calls to functions or methods if interface 210 is an API. They can also comprise system calls if interface 210 is a system-call interface for an operating system. Finally, if interface 210 implements an instruction-set architecture, the thread-location call and/or the targeted-store call can comprise executions of instructions defined within the instruction-set architecture.

Thread-Location Instruction

Figure 4:
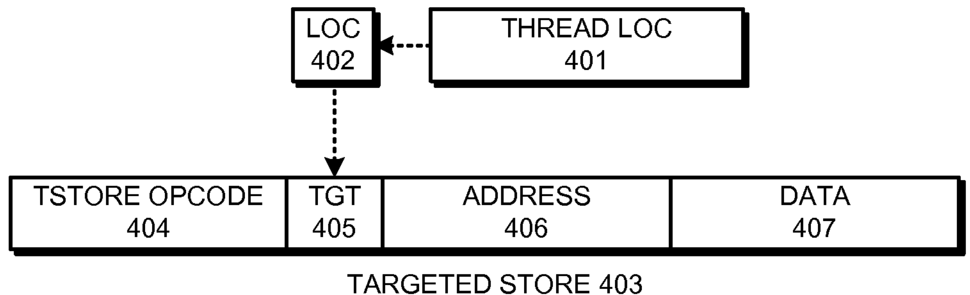
FIG. 4 illustrates how a thread-location instruction is used in conjunction with a targeted-store instruction in accordance with the disclosed embodiments.

FIG. 4 illustrates how a thread-location instruction 401 (e.g., localTarget( )) is used with a targeted-store instruction 403 in accordance with the disclosed embodiments. As is illustrated in FIG. 4, thread-location instruction 401 may have no input parameters and returns a location identifier 402, which can be used to identify a cache that the thread is likely to be accessing within shared-memory multiprocessor system 100. In contrast, targeted-store instruction 403 has a number of fields, including an opcode field 404, which contains a bit pattern indicating that the instruction is a targeted-store instruction. It also includes a target field 405 which stores an identifier for a specific cache to which the targeted store is directed. Like any normal store instruction, targeted-store instruction 403 also includes an address field 406, which specifies an address to which the store is directed (or alternatively specifies a register that contains the address), and a data field 407, which contains data to be written to the address.

During system operation, when a thread executes thread-location instruction 401, thread-location instruction 401 returns a location 402 which can be used to identify a cache that the thread is likely to be accessing within the multiprocessor system. Next, location 402 can be inserted into the target field 405 of targeted-store instruction 403, which performs a targeted store directed to the specified target cache.

Figure 5:
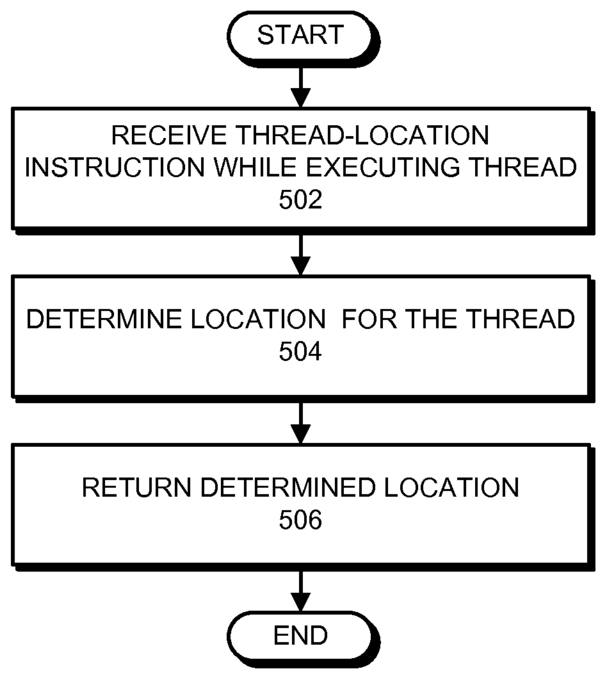
FIG. 5 presents a flow chart illustrating how the system executes a thread-location instruction in accordance with the disclosed embodiments.

FIG. 5 presents a flow chart illustrating how the system executes a thread-location instruction 401 in accordance with the disclosed embodiments. The process starts when a processor core that is executing a thread receives the thread-location instruction 401 (step 502). Then, in response to receiving thread-location instruction 401, the system determines a location 402 for the thread (step 504). Note that this location 402 can, for example, be an L1 or L2 cache which the thread is likely to access.

This location 402 can be determined in a number of ways. In some embodiments, the thread-location instruction 401 makes a system call to system software 131, and system software 131 examines thread-specific state information 132 to identify a processor core on which the thread is executing. By identifying a specific processor core, the system implicitly identifies a specific L1 or L2 cache that the processor core is likely to access. However, a system call typically takes a long time to execute. Hence, to improve performance, in other embodiments the thread-location instruction 401 directly accesses state information 122 contained in semiconductor chip 141 that the thread is executing on, and state information 122 is used to determine which cache the thread is likely to access.

Next, the determined location 402 is returned by the instruction (step 506).

Monitoring Targeted Stores

The following discussion relates to the ideas disclosed in U.S. patent application Ser. No. 13/625,700 (the '700 application), entitled "Supporting Targeted Stores in a Shared-Memory Multiprocessor System" by the same inventors as the instant application, filed 24 Sep. 2012, which is hereby incorporated by reference. The instant application builds on the ideas disclosed in the '700 application by describing mechanisms that threads can use to wait for targeted stores. We can characterize these ideas as "multi-location MONITOR/MWAIT," because they are somewhat similar in spirit to the MONITOR/MWAIT instructions already implemented in some processor architectures, such as the Intel x86™ processor architecture. However, the problem we intend to solve requires significantly different implementation approaches.

Briefly, existing MONITOR/MWAIT implementations are able to await modifications to addresses within a single cache line, and they achieve this by loading this line in to the local cache, and then monitoring the cache to detect changes to locations in that cache line. When another thread modifies a location in this cache line, it requests exclusive ownership of the cache line, thus allowing the cache to detect the modification and inform the waiting thread that it should load the location. Because the waiting thread does not need to actively monitor the location (for example in a spin loop), it can be put into a state in which it consumes less energy and does not compete with other threads for resources such as functional units and cache bandwidth.

Existing MONITOR/MWAIT implementations do not fulfill the purposes of our system that supports targeted stores for two primary reasons. First, they are limited to monitoring locations in only a single cache line. In contrast, we want to be able to monitor multiple locations, not limited to fit in a single cache line. Although numerous variations are possible, for concreteness in this description, we assume threads can monitor locations in a single address range defined by a base address and size. Because existing implementations require the locations being waited upon to be held in cache, and that the cache be monitored for changes, extending these implementations to support monitoring of larger address ranges is likely to be impractical.

More importantly, however, waiting for updates to a location by holding and monitoring its cache line is contradictory with the goals of targeted stores. The primary motivation for targeted stores is to reduce or eliminate unnecessary coherence communication (which increases both latency and consumption of coherence bandwidth) involved when one thread S is waiting for stores to a memory location and another thread C stores to it. In typical existing systems, C will have to send a coherence message to S in order to request ownership of the cache line; then, S must acknowledge the request before C can even perform its store. For S to then load the stored value, similar round trip communication is required again. Targeted stores aim to overcome this problem by allowing C to target its store toward S (say, to a cache near the core where S is executing), so that S does not need to load the location before it is stored, setting up the above-described sequence of excessive communication.

The ’700 application describes a number of possible approaches for implementing targeted stores. At first glance, it appears that we may have to design multi-location MONITOR/MWAIT implementations especially for each targeted store implementation. However, it turns out that this is not necessary, as the implementations of the two mechanisms can be largely independent. The key observation that led us to this realization was that, in all targeted store implementations, a store that is targeted to a given cache will always send a message to that cache, identifying the address to be stored. This is sufficient to enable notification of threads that may be waiting for the location to be modified via a targeted store: the particular details of whether the cache is able to accept the targeted store, what state it uses for the cache line underlying the targeted location, what it does in case it is unable to accept the store, etc., are not important.

As discussed in detail in the ’700 application, in some targeted store implementations it may be difficult for a cache to accept a cache line sent via a targeted store because the receiving cache has not previously allocated a way for it. Note that it is not only acceptable, but also desirable, to notify a thread waiting for a targeted store when a message arrives with that targeted store, even if the receiving cache is unable to accept and store the line with the stored value. The reason is that, in this case, the thread should load the location in order to retrieve the value that could not be accepted. (Note that when a load is initiated by the receiver, a way can be allocated in the cache in advance to hold the cache line when it is received in response to the load, in contrast to messages resulting from targeted stores, which may arrive at any moment, making it difficult in some cases for the receiving cache to accept the line.)

In the following description, we describe possible implementation approaches for multi-location MONITOR/MWAIT, assuming only that a targeted store results in a message to the target cache identifying the address being stored to.

In some embodiments a thread may wait for any targeted store, eliminating the need to specify the address(es) for which it is waiting. Such embodiments may be appropriate for configurations in which targeted stores are targeted to specific hardware threads or to non-shared caches. In general, however, in embodiments in which stores are targeted to shared caches, threads on all cores that are waiting when a targeted store is received would need to be notified, resulting in inefficiency and duplication.

Therefore, in general, it will be desirable for a core to be able to request the range of addresses it wishes to monitor. In some embodiments, this would be achieved via a special instruction that specifies a base address and a number of words to monitor starting at that address. The instruction would inform the target cache that the core requests to monitor targeted stores to the specified address range. Thus, when a cache receives a targeted store, it can detect whether a core is monitoring a range including the targeted address, informing the core of the targeted store if so.

In addition to being informed that a location it is monitoring has received a targeted store, it would be useful for a thread to be able to receive information about which address has been stored to, in order to reduce the latency involved in loading the stored value. For example, we may want to implement a concurrent data structure that uses a service thread to perform operations that are requested by client threads via targeted stores. In general, these service threads may monitor a number of locations for requests. Once a service thread has been informed of a request being made, we would like it to be able to receive the request (by loading from the location to which the targeted store was performed) as soon as possible.

For this reason, it may be desirable for a cache receiving a targeted store to provide more information to a thread monitoring an address range including the targeted location than the mere fact that some address in this range has received a targeted store. Ideally, the cache would inform the thread of each location that has been stored to. However, storing such information for long enough to be useful to the service thread may be problematic for at least two reasons.

First, it may be undesirable to devote enough resources to be able to store all of the addresses that have received targeted stores. Furthermore, there is no way to bound how many targeted stores may be received during the time a receiving thread is processing requests, so even if it is acceptable to devote considerable resources to this purpose, in general, we must still deal with the possibility that these resources are insufficient to record enough addresses to allow the receiving thread to process requests before the resources used to record their addresses must be reclaimed.

An intermediate possibility is for the cache to maintain a summary of addresses for which targeted stores have been received, which would help the receiving thread to quickly determine which address ranges or sub-ranges it should scan for requests. As a simple example, this summary information could be in the form of a fixed-size bitmap. For example, the summary might be 64 bits, with the ith bit being true if a targeted store request has been received for an address in the range [base+i/(size/64), base+(i+1)/(size/64)) since the last time the summary was reset. This allows a receiving thread to quickly acquire a summary of which sub-ranges it should scan to find requests that have been stored into the range it is monitoring Moreover, these techniques may be used in combination. For example, resources may be allocated to store a fixed number of addresses. If the receiving thread is able to process requests fast enough that there is always space to store the address for an incoming targeted store, then the receiving thread will always have a specific address to load from, thus minimizing time spent scanning for requests.

In case a targeted store is received and no resources are available to store its address, the corresponding bit in a bitmap summary, as described above, may be set. This way, while a receiving thread is able to keep up with the targeted stores it receives, it is able to immediately determine the address from which it should load its next request. If it is unable to keep up, forcing bits to be recorded in a summary bitmap, it still receives information to focus its search for locations that have received targeted stores.

In addition or alternatively, one or more bits of information may be maintained that allow a cache to communicate to a thread that it has been unable to record information about all incoming messages requesting targeted stores to addresses the thread is monitoring. In this case, the thread may need to initiate a scan of the entire address range it is monitoring because it has no information (with the possible exception of the fact that a targeted store has been performed to one of the locations in the address range it is monitoring). It is desirable that this option is not required too often, especially if the requests are sparse (in which case scanning yields relatively few requests).

Nonetheless, we note that, for at least some targeted store implementations, a service thread in the concurrent data structure implementation alluded to above must periodically scan all request locations. This may be because the service thread may occasionally be migrated to a different core, so that it will no longer be notified in response to a targeted store that is targeted to a cache near the core the service thread was running on previously. Information provided by a good multi-location MONITOR/MWAIT implementation, such as described above, may be able to significantly reduce how often such scanning must be performed.

We further note that the information provided to the thread about which locations have received targeted stores is merely heuristic in many embodiments, because a receiving thread will occasionally scan all locations it is monitoring, so a lost notification will not result in losing a request (though it will delay its processing); similarly, because the thread loads a location and checks its contents to determine if there is a request, a "spurious" notification also will not cause incorrect behavior.

This observation is important because it gives the implementation more freedom. For example, it implies that there is no need for notification state (such as addresses and summary bitmaps) to be preserved by context switches. We note, however, that the more reliable this information is, the less often it is necessary for a thread to scan the locations it is monitoring. For example, if a thread is able to atomically clear the summary bitmap without interfering with the setting of a bit due to a concurrent incoming request, then there is less chance of a lost notification, and thus the scanning policy can be less aggressive without harming performance. On a related note, if a receiving thread that is preempted and subsequently rescheduled receives an indication that some address and/or summary information may have been lost due to the context switch, it can immediately initiate a full scan, and then avoid another one until the next context switch.

We next describe a monitoring circuit which can be used to monitor for targeted stores which are directed to a specific addresses.

Monitoring Circuit

Figure 6:
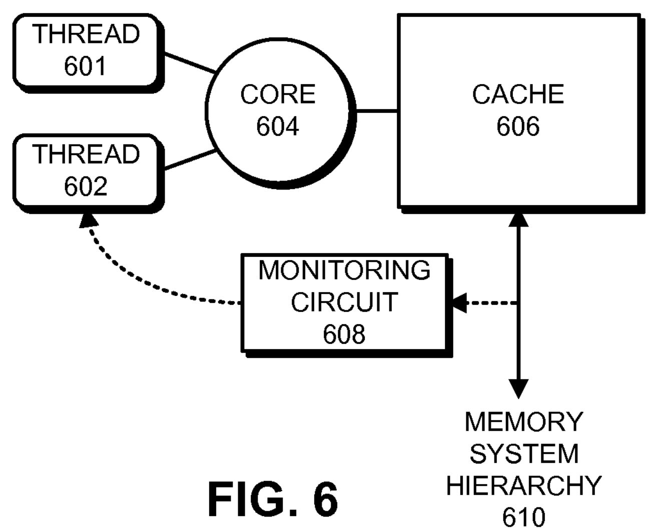
FIG. 6 illustrates a monitoring circuit that looks for a targeted store having a destination address that matches a monitored address in accordance with the disclosed embodiments.

FIG. 6 illustrates a monitoring circuit that looks for a targeted store having a destination address that matches a monitored address in accordance with the disclosed embodiments. As illustrated in FIG. 6, monitoring circuit 608 monitors memory system coherence traffic between a memory system hierarchy 610 and a cache 606. During operation, monitoring circuit 608 looks for targeted stores which are directed to specific memory locations, and if such a targeted store is detected, monitoring circuit 608 notifies an associated thread 602. Note that thread 602 executes on a processor core 604 which accesses cache 606. Also note that cache 606 can generally include any type of cache which is accessed by thread 602, including an L1 cache, an L2 cache, an L3 cache, or even a set of caches which are proximate to core 604.

Figure 7A:
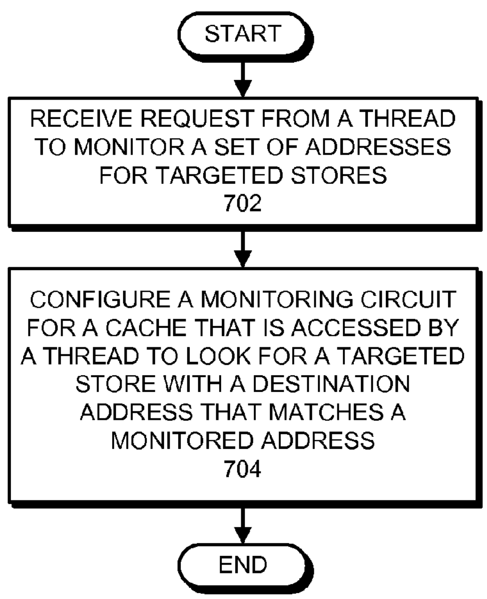
FIG. 7A presents a flow chart illustrating how the monitoring circuit is configured to look for a targeted store having a destination address that matches a monitored address in accordance with the disclosed embodiments.

FIG. 7A presents a flow chart illustrating how monitoring circuit 608 is configured to look for a targeted store in accordance with the disclosed embodiments. During operation, the system receives a request from a thread 602 to monitor a set of addresses for targeted stores (step 702). In response to this request, the system configures a monitoring circuit 608, which is associated with a cache that is accessed by thread 602, to look for a targeted store with a destination address that matches one of the monitored addresses (step 704). Note that the set of monitored addresses can be a contiguous address range, which is specified within monitoring circuit 608 by a base address and a range size, or alternatively by a starting address and an ending address for the range. (In this case, all addresses falling within this contiguous range are considered "monitored addresses.") Alternatively, the set of monitored addresses can be a set of non-contiguous addresses, in which case the addresses can be specified within monitoring circuit 608 using a list of addresses, or a list of address ranges, or a bit vector for an address range. Also note that monitoring circuit 608 can include one or more comparators which are used to compare a destination address for a targeted store operation with specific monitored addresses or address ranges.

Figure 7B:
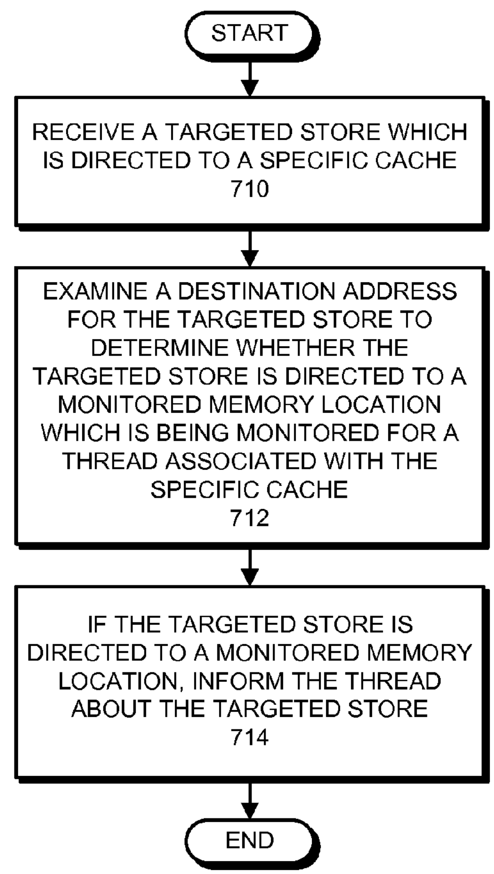
FIG. 7B presents a flow chart illustrating the process of monitoring targeted stores in accordance with the disclosed embodiments.

FIG. 7B presents a flow chart illustrating the process of using the monitoring circuit to look for targeted stores in accordance with the disclosed embodiments. During operation, the system receives a targeted store which is directed to a specific cache in a shared-memory multiprocessor system (step 710). For example, monitoring circuit 608 in FIG. 6 can receive a targeted store which is directed to associated cache 606. In response to receiving the targeted store, the system examines a destination address for the targeted store to determine whether the targeted store is directed to a monitored memory location which is being monitored for a thread associated with the specific cache (step 712). For example, monitoring circuit 608 can compare the destination address for the targeted store against addresses which are being monitored on behalf of one or more threads which are accessing cache 606.

Next, if the targeted store is directed to a monitored memory location, the system informs thread 602 about the targeted store (step 714). This allows thread 602 to leave an idle state or to wake up to process the targeted store. The message which informs thread 602 about the targeted store can also include information which specifies a destination address for the targeted store. Alternatively, thread 602 can make a special system call, execute a special instruction, or read a special register to obtain this destination address information from monitoring circuit 608.

Monitoring circuit 608 can maintain this destination address information for targeted stores in a number of ways. For example, monitoring circuit 608 can maintain a queue to hold such targeted store destination addresses. However, if a large number of targeted stores are received, it may not be possible to store all of the addresses in such a queue. In this case, monitoring circuit 608 can maintain a bitmap for each thread, wherein the bitmap provides summary information indicating sets of addresses (in a set of multiple memory locations which are being monitored for the thread) that may have received targeted stores. In another example, the system can simply inform thread 602 that a targeted store directed to a monitored address has been received without specifying the destination address for the targeted store. In this case, thread 602 will have to search through the monitored addresses to determine which one received the targeted store.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for monitoring targeted stores in a shared-memory multiprocessor, comprising:

receiving a targeted store which is directed to a specific cache in a shared-memory multiprocessor system;

in response to receiving the targeted store, examining a destination address for the targeted store to determine whether the targeted store is directed to a monitored memory location which is being monitored for a thread associated with the specific cache; and when the targeted store is directed to a monitored memory location, informing the thread about the targeted store.

2. The method of claim 1, wherein the monitored memory location is one of a set of multiple memory locations being monitored for the thread.

3. The method of claim 1, wherein the specific cache comprises a set of proximate cache memories in the shared-memory multiprocessor.

4. The method of claim 1, wherein upon receiving a request to monitor a set of monitored addresses for a thread, the method further comprises configuring a monitoring circuit associated with the specific cache to look for a targeted store having a destination address that matches a monitored address for the thread.

5. The method of claim 1, wherein determining whether the targeted store is directed to a monitored memory location includes using a monitoring circuit which is proximate to but separate from the specific cache to determine whether the destination address for the targeted store is directed to a monitored memory location.

6. The method of claim 1, wherein determining whether the targeted store is directed to a monitored memory location includes using a monitoring circuit which is incorporated into the specific cache to determine whether the destination address for the targeted store is directed to a monitored memory location.

7. The method of claim 1, wherein informing the thread about the targeted store includes communicating the destination address for the targeted store to the thread.

8. The method of claim 1, wherein informing the thread about the targeted store includes communicating a bitmap to the thread, wherein the bitmap provides summary information indicating sets of addresses, in a set of multiple memory locations which are being monitored for the thread, that may have received targeted stores.

9. The method of claim 1, wherein informing the thread about the targeted store includes informing the thread that an unspecified location, in a set of multiple memory locations which are being monitored for the thread, has received a targeted store.

10. A shared-memory multiprocessor that monitors for targeted stores, comprising:

a plurality of processors;

a plurality of cache memories coupled to the plurality of processors; and a plurality of monitoring circuits, wherein each monitoring circuit is associated with a cache memory, and when a targeted store is directed to the cache memory, the monitoring circuit is configured to, examine a destination address for the targeted store to determine whether the targeted store is directed to a monitored memory location, which is being monitored for a thread associated with the cache; and when the targeted store is directed to a monitored memory location, inform the thread about the targeted store.

11. The shared-memory multiprocessor of claim 10, wherein the monitored memory location is one of a set of multiple memory locations being monitored for the thread.

12. The shared-memory multiprocessor of claim 10, wherein the cache memory comprises a set of proximate cache memories.

13. The shared-memory multiprocessor of claim 10, wherein upon receiving a request to monitor a set of monitored addresses for a thread, the shared-memory multiprocessor configures a monitoring circuit for a cache associated with the thread to look for a targeted store having a destination address that matches a monitored address for the thread.

14. The shared-memory multiprocessor of claim 10, wherein each monitoring circuit is proximate to but separate from an associated cache memory.

15. The shared-memory multiprocessor of claim 10, wherein each monitoring circuit is incorporated into an associated cache memory.

16. The shared-memory multiprocessor of claim 10, wherein while informing the thread about the targeted store, the monitoring circuit is configured to communicate the destination address for the targeted store to the thread.

17. The shared-memory multiprocessor of claim 10, wherein while informing the thread about the targeted store, the monitoring circuit is configured to communicate a bitmap to the thread, wherein the bitmap provides summary information indicating sets of addresses, in a set of multiple memory locations which are being monitored for the thread, that may have received targeted stores.

18. The shared-memory multiprocessor of claim 10, wherein while informing the thread about the targeted store, the monitoring circuit is configured to inform the thread that an unspecified location, in a set of multiple memory locations which are being monitored for the thread, has received a targeted store.

19. The shared-memory multiprocessor of claim 10, further comprising a main memory coupled to the plurality of cache memories.

20. A method for monitoring stores in a shared-memory multiprocessor, comprising:

receiving a store which is directed to a specific destination address in a shared-memory multiprocessor system;

in response to receiving the store, examining the destination address for the store to determine whether the store is directed to a monitored memory location which is one of a set of multiple memory locations being monitored for a thread; and when the store is directed to a monitored memory location, informing the thread about the store.

* * * * *

UNITED STATES PATENT AND TRADEMARK OFFICE

CERTIFICATE OF CORRECTION

PATENT NO. : 8,990,503 B2
APPLICATION NO. : 13/754700
DATED : March 24, 2015
INVENTOR(S) : Moir et al.

It is certified that error appears in the above-identified patent and that said Letters Patent is hereby corrected as shown below:

In the specification

In column 8, line 58, delete “monitoring” and insert -- monitoring. --, therefor.

Signed and Sealed this
Third Day of November, 2015

Michelle K. Lee
*Director of the United States Patent and Trademark Office*